United States Patent
Itou et al.

(10) Patent No.: US 11,052,771 B2
(45) Date of Patent: Jul. 6, 2021

(54) VEHICLE-MOUNTED POWER SUPPLY DEVICE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Takanori Itou, Yokkaichi (JP); Seiji Takahashi, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 56 days.

(21) Appl. No.: 16/467,552

(22) PCT Filed: Nov. 21, 2017

(86) PCT No.: PCT/JP2017/041803
§ 371 (c)(1),
(2) Date: Jun. 7, 2019

(87) PCT Pub. No.: WO2018/105383
PCT Pub. Date: Jun. 14, 2018

(65) Prior Publication Data
US 2019/0308573 A1    Oct. 10, 2019

(30) Foreign Application Priority Data

Dec. 8, 2016 (JP) .............................. JP2016-238537

(51) Int. Cl.
*B60L 50/50* (2019.01)
*B60R 16/033* (2006.01)
(Continued)

(52) U.S. Cl.
CPC ................. *B60L 50/50* (2019.02); *B60L 9/18* (2013.01); *B60R 16/03* (2013.01); *B60R 16/033* (2013.01);
(Continued)

(58) Field of Classification Search
None
See application file for complete search history.

(56) References Cited

U.S. PATENT DOCUMENTS

2010/0019569 A1* 1/2010 Izumi ..................... B60L 58/20
307/9.1
2010/0060080 A1    3/2010 Sawada et al.
(Continued)

FOREIGN PATENT DOCUMENTS

JP    2001-204137 A    7/2001
JP    2009-071898 A    4/2009

OTHER PUBLICATIONS

International Search Report, Application No. PCT/JP2017/041803, dated Jan. 23, 2018. ISA/Japan Patent Office.

*Primary Examiner* — Lincoln D Donovan
*Assistant Examiner* — Khareem E Almo
(74) *Attorney, Agent, or Firm* — Honigman LLP

(57) ABSTRACT

Provided is a vehicle-mounted power supply device detecting connection with an external power source and charging a power storage unit by stepping up a supply voltage based on the external power source. A vehicle-mounted power supply device includes an external terminal to which a power supply path from an external power source is connectable, a detection unit detects that the power supply path is connected to the external terminal, and a power supply circuit unit allows for flow of a current from the external terminal side toward the second conduction path side at least when the power supply path is connected to the external terminal. The control unit controls a step-down operation
(Continued)

and a step-up operation of the voltage conversion unit, and causes the voltage conversion unit to perform the step-up operation when connection between the external terminal and the power supply path is detected by the detection unit.

19 Claims, 5 Drawing Sheets

(51) Int. Cl.
  *H02M 1/08* (2006.01)
  *H02M 3/04* (2006.01)
  *B60L 9/18* (2006.01)
  *B60R 16/03* (2006.01)
  *H02J 7/00* (2006.01)
  *H02J 1/00* (2006.01)
  *H02M 3/155* (2006.01)

(52) U.S. Cl.
  CPC .............. *H02J 1/00* (2013.01); *H02J 7/00* (2013.01); *H02M 1/08* (2013.01); *H02M 3/04* (2013.01); *H02M 3/155* (2013.01); *Y02T 10/70* (2013.01); *Y02T 10/72* (2013.01); *Y02T 10/92* (2013.01); *Y02T 90/12* (2013.01)

(56) References Cited

U.S. PATENT DOCUMENTS

| | | | |
|---|---|---|---|
| 2010/0096918 A1* | 4/2010 | Sawada | B60L 7/14 307/9.1 |
| 2011/0193532 A1 | 8/2011 | Iwanaga et al. | |
| 2011/0208383 A1* | 8/2011 | Yamamoto | B60L 58/40 701/22 |
| 2012/0055727 A1* | 3/2012 | Omiya | B60W 10/26 180/279 |
| 2015/0314754 A1* | 11/2015 | Eto | B60L 50/20 340/436 |
| 2016/0016483 A1* | 1/2016 | Yasunori | B60L 58/20 320/162 |
| 2017/0310142 A1* | 10/2017 | Watanabe | H01M 8/0432 |
| 2019/0168634 A1* | 6/2019 | Teng | B60L 3/04 |
| 2019/0173274 A1* | 6/2019 | Fukae | H01M 10/48 |
| 2019/0280595 A1* | 9/2019 | Yabuta | B60L 50/60 |

* cited by examiner

VEHICLE-MOUNTED POWER SUPPLY DEVICE

CROSS-REFERENCE TO RELATED APPLICATIONS

This application is the U.S. national stage of PCT/JP2017/041803 filed on Nov. 21, 2017, which claims priority of Japanese Patent Application No. JP 2016-238537 filed on Dec. 8, 2016, the contents of which are incorporated herein.

TECHNICAL FIELD

The present disclosure relates to a vehicle-mounted power supply device.

BACKGROUND

There are known vehicle-mounted systems that supply electric power to two systems, that is, a low-voltage system and a high-voltage system, and technology such as that disclosed in 2001-204137A has been proposed in relation to such systems. 2001-204137A discloses a power supply circuit that includes a small-capacity DC-DC converter and a large-capacity DC-DC converter that are disposed between a high-voltage direct current power source and a low-voltage load and serve as DC-DC converters for stepping down a voltage, and the power supply circuit switches a converter to be used depending on the required supply power.

In a system that supplies electric power to two systems, that is, a low-voltage system and a high-voltage system as disclosed in 2001-204137A, if the high-voltage system is provided with a power storage unit and output of this power storage unit of the high-voltage system is made available for loads of the low-voltage system by stepping down the output, the necessity of a power storage unit in the low-voltage system can be reduced or obviated, and the power storage unit in the low-voltage system can be omitted or downsized. For example, if a starter can be operated using electric power from the power storage unit of the high-voltage system, the power storage unit of the low-voltage system is not necessary to start an engine, and therefore the power storage unit of the low-voltage system can be omitted or downsized easily.

However, such a configuration depending on the power storage unit of the high-voltage system has a problem in that it is difficult to cope with a significant decrease in the capacity of the power storage unit of the high-voltage system.

If the capacity of the power storage unit of the high-voltage system significantly decreases, the starter cannot be operated unless some measures are taken, resulting in failure to start the engine. Accordingly, the power storage unit of the high-voltage system needs to be charged by, for example, using an external power source such as a battery (for example, a battery of 12 V) mounted in another vehicle. However, in a case where a battery with a low output voltage is used as the external power source, the charging cannot be performed by merely connecting the external power source, and therefore there is a need for a configuration for stepping up the output of the external power source after definitely detecting connection with the external power source, and supplying the stepped-up output to the power storage unit of the high-voltage system.

The present disclosure was made under the above circumstances, and it is an object of the present disclosure to provide a vehicle-mounted power supply device that is capable of definitely detecting connection with an external power source and charging a power storage unit by stepping up a supply voltage that is based on the external power source.

SUMMARY

A vehicle-mounted power supply device as an example of the present disclosure includes: a voltage conversion unit that is connected to a first conduction path electrically connected to a vehicle-mounted power storage unit and a second conduction path, and is configured to perform a step-down operation of stepping down a voltage applied to the first conduction path and applying the stepped-down voltage to the second conduction path, and a step-up operation of stepping up a voltage applied to the second conduction path and applying the stepped-up voltage to the first conduction path; an external terminal to which a power supply path from an external power source is connectable. A detection unit is configured to detect that the power supply path is connected to the external terminal. A power supply circuit unit is configured to allow for flow of a current from the external terminal side toward the second conduction path side at least when the power supply path is connected to the external terminal. A control unit is configured to control the step-down operation and the step-up operation of the voltage conversion unit and cause the voltage conversion unit to perform the step-up operation when connection between the external terminal and the power supply path is detected by the detection unit, wherein when a direct current power source is connected to the external terminal, the power supply circuit unit applies a direct current voltage corresponding to an output voltage of the direct current power source to the second conduction path.

Advantageous Effects of Disclosure

In the above-described vehicle-mounted power supply device, the detection unit detects that the power supply path is connected to the external terminal, and the power supply circuit unit allows for flow of a current from the external terminal side toward the second conduction path side at least when the external power supply path is connected to the external terminal. Further, the control unit causes the voltage conversion unit to perform the step-up operation in such a state where electric power is supplied from the outside to the second conduction path side via the external terminal, and therefore it is possible to apply a relatively high voltage to the first conduction path that is electrically connected to the power storage unit and favorably charge the power storage unit. Particularly, when the charging voltage of the power storage unit decreases and there are problems in operating vehicle-mounted apparatuses, it is possible to definitely detect connection with the external power source and charge the power storage unit by stepping up a supply voltage based on the external power source, and therefore restoration from such a situation can be properly carried out.

DETAILED DESCRIPTION OF PREFERRED EMBODIMENTS

Figure 1:
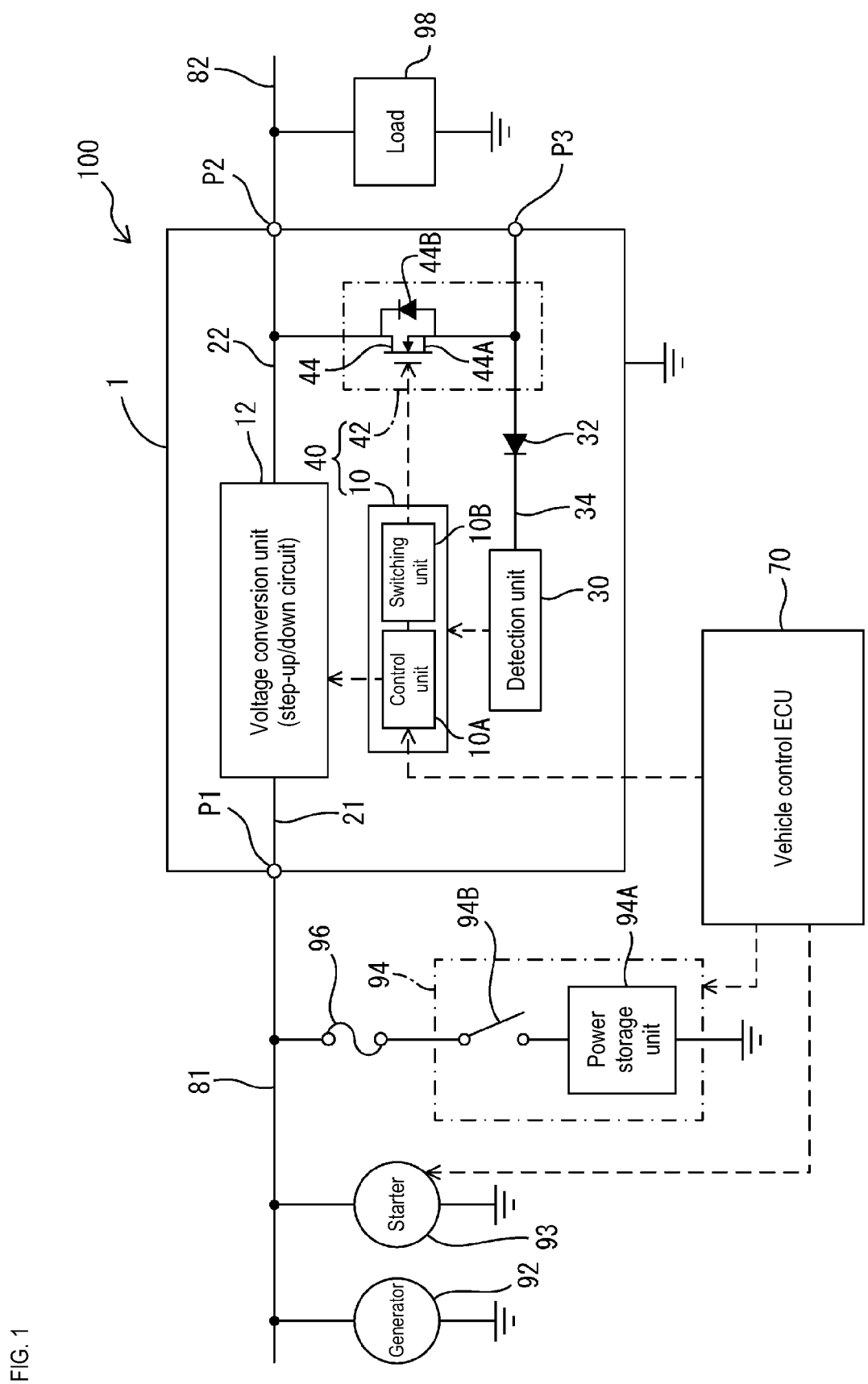
FIG. 1 is a circuit diagram schematically illustrating a vehicle-mounted power supply system that includes a vehicle-mounted power supply device of a first embodiment.

The following describes preferred examples of the present disclosure.

The power supply circuit unit may be configured to cut off flow of a current from the second conduction path toward the external terminal side at least when the second conduction path is in a predetermined normal output state, and to allow for flow of a current from the external terminal side toward the second conduction path side when the power supply path is connected to the external terminal.

The vehicle-mounted power supply device of this configuration prevents flow of a current from the second conduction path toward the external terminal side when the voltage applied to the second conduction path is in the normal output state, and therefore it is possible to keep the external terminal in a state where it is hardly affected by the second conduction path. On the other hand, when the power supply path is connected to the external terminal (that is, when electric power can be supplied from the external power source via the external terminal), a current can flow from the external terminal side toward the second conduction path side, and accordingly it is possible to perform the step-up operation of stepping up an input voltage based on the external power source and applying the stepped-up voltage to the first conduction path.

The power supply circuit unit may include: a semiconductor switch that includes a diode portion and a switch portion, the diode portion having an anode electrically connected to the external terminal and a cathode electrically connected to the second conduction path, the switch portion being switched between an electrically connected state and an electrically disconnected state between the second conduction path and the external terminal; and a switching unit that switches the switch portion to the electrically disconnected state if connection between the external terminal and the power supply path is not detected by the detection unit, and switches the switch portion to the electrically connected state if connection between the external terminal and the power supply path is detected by the detection unit.

The vehicle-mounted power supply device of this configuration can prevent flow of a current from the second conduction path toward the external terminal side when connection between the external terminal and the power supply path (that is, a state where electric power is supplied from the external power source via the external terminal) is not detected by the detection unit, and switch the switch portion to the electrically connected state when connection between the external terminal and the power supply path is detected by the detection unit, and thus the vehicle-mounted power supply device can allow for flow of a current from the external terminal side toward the second conduction path side while suppressing a conduction loss.

The power supply circuit unit may be constituted by a diode that has an anode electrically connected to the external terminal and a cathode electrically connected to the second conduction path.

The vehicle-mounted power supply device of this configuration can realize a simpler configuration of a circuit that is capable of cutting off flow of a current from the second conduction path toward the external terminal side when the second conduction path is in the predetermined normal output state and allowing for flow of a current from the external terminal side toward the second conduction path side when the power supply path is connected to the external terminal.

A generator may be connected to the first conduction path. When connection between the external terminal and the power supply path is detected by the detection unit, the control unit may cause the voltage conversion unit to perform the step-up operation so that a voltage lower than an output voltage of the generator is output to the first conduction path.

The vehicle-mounted power supply device of this configuration can charge the power storage unit by preferentially using electric power from the generator for example when power generation of the generator and the step-up operation of the voltage conversion unit are performed during the same period, and therefore consumption of the electric power from the external power source tends to be suppressed.

The voltage conversion unit may include a step-up/down circuit unit that selectively performs the step-down operation or the step-up operation.

The vehicle-mounted power supply device of this configuration can perform, with a simpler configuration, the step-down operation of stepping down a voltage applied to the first conduction path and applying the stepped-down voltage to the second conduction path at a normal time during which the step-down operation should be performed, and perform the step-up operation under a condition that the power supply path is connected to the external terminal when charging should be performed by electrically connecting the external power source to the external terminal.

The voltage conversion unit may include a step-down circuit unit that performs the step-down operation of stepping down a voltage applied to the first conduction path and applying the stepped-down voltage to the second conduction path, and a step-up circuit unit that is a path different from the step-down circuit unit, steps up a voltage applied to the second conduction path, and applies the stepped-up voltage to the first conduction path.

This vehicle-mounted power supply device can perform the step-down operation through the step-down circuit unit in a normal state so that the voltage applied to the first conduction path is stepped down and is applied to the second conduction path, and can also perform the step-up operation through the step-up circuit unit when the power supply path is connected to the external terminal so that the voltage applied to the second conduction path is stepped up and is applied to the first conduction path. The step-down operation and the step-up operation can be independently performed by the different circuit units, and therefore operation of one circuit unit is unlikely to be restricted by operation of the other circuit unit.

When connection between the external terminal and the power supply path is detected by the detection unit, the control unit may cause the step-down circuit unit to perform the step-down operation while causing the step-up circuit unit to perform the step-up operation so that there is a period during which both the step-up circuit unit and the step-down circuit unit operate This vehicle-mounted power supply device can perform the step-down operation simultaneously with the step-up operation during which the power storage unit can be charged, and therefore proper electric power can be supplied to an apparatus connected to the second conduction path even during the charging.

First Embodiment

The following describes a first embodiment as a specific embodiment of the present disclosure.

A vehicle-mounted power supply system 100 (hereinafter also referred to as a power supply system 100) illustrated in FIG. 1 is configured as a system capable of supplying electric power to two systems, that is, a power supply path 81 of a high-voltage system and a power supply path 82 of a low-voltage system. The power supply system 100 is a power supply system that applies a relatively high voltage (for example, about 48 V) to the power supply path 81 of the high-voltage system and applies a relatively low voltage (for example, about 12 V) to the power supply path 82 of the low-voltage system, and is capable of supplying electric power to electric apparatuses that are connected to the power supply paths 81 and 82.

The power supply system 100 mainly includes a generator 92, a power storage device 94, the power supply paths 81 and 82, a vehicle-mounted power supply device 1 (hereinafter also referred to as a power supply device 1), and the like, and is controlled by one or a plurality of control devices (in the example of FIG. 1, a vehicle control ECU 70). In the power supply system 100, the generator 92 and the power storage device 94 are electrically connected to the power supply path 81 of the high-voltage system, and a low-voltage load 98 is connected to the power supply path 82 of the low-voltage system. Although not illustrated, a high-voltage load such as a heater may be connected to the power supply path 81 of the high-voltage system. The power supply paths 81 and 82 are wiring units that serve as power paths for transmitting electric power.

The vehicle control ECU 70 is a vehicle-mounted electronic control unit that is capable of receiving information from and sending information to the generator 92, the power storage device 94, and the power supply device 1, and includes various devices such as one or a plurality of information processing devices, a storage device, and an AD converter. The vehicle control ECU 70 has a function of instructing a starter 93 to perform a starter operation, a function of instructing the power storage device 94 to perform an on/off operation of a relay 94B, and a function of instructing a control device 10 to perform a step-up operation or a step-down operation, for example. Note that the vehicle control ECU 70 may be constituted by a single electronic control device or a plurality of electronic control devices.

The generator 92 is configured as a known vehicle-mounted generator and has a function of generating electricity through rotation of a rotation shaft of an engine (not illustrated). The starter 93 is configured as a known vehicle-mounted starter and functions as a starter that gives a rotational force to the rotation shaft of the engine. When the generator 92 is operating, electric power generated by the generator 92 is rectified and then supplied as direct current power to the power storage device 94. The generator 92 applies an output voltage of, for example, a predetermined value V1 (for example, about 48 V) to the power supply path 81 while generating electricity. The starter 93 operates using electric power supplied from the power storage device 94 while the engine is stopped, and gives a rotational force to the engine for starting.

The power storage device 94 includes a vehicle-mounted power storage unit 94A (hereinafter also referred to as a power storage unit 94A) and the relay 94B.

The power storage unit 94A is constituted by a known vehicle-mounted power storage means such as an electric double layer capacitor, a lead battery, or a lithium-ion battery, and is electrically connected to the power supply path 81 via the relay 94B and a fuse 96. When the power storage unit 94A is fully charged, an output voltage of the power storage unit 94A is 48 V, for example, and its high-potential side terminal is kept at about 48 V. A low-potential side terminal of the power storage unit 94A is kept at a ground potential (0 V), for example.

The relay 94B is disposed between an output terminal (the high-potential side terminal) of the power storage unit 94A and the power supply path 81, and performs a switching operation for electrically connecting or disconnecting the power storage unit 94A and the power supply path 81. A non-illustrated charge control device is provided inside the power storage device 94 or the power supply device 1, for example, and is configured to be capable of monitoring overdischarge of the power storage unit 94A. For example, the charge control device monitors the output voltage of the power storage unit 94A, and when the output voltage of the power storage unit 94A is at least a threshold voltage Vth1 (a threshold value set to be lower than the above-described predetermined value V1), keeps the relay 94B in an on state to electrically connect the power storage unit 94A and the power supply path 81. In contrast, when the output voltage of the power storage unit 94A becomes less than the threshold voltage Vth1, the charge control device switches the relay 94B to an off state to cut off the electrical connection between the power storage unit 94A and the power supply path 81. Note that the fuse 96 that cuts off the current at the time of overdischarge is disposed between the relay 94B and the power supply path 81.

The low-voltage load 98 is a known vehicle-mounted electric apparatus mounted in a vehicle, and is only required to be capable of operating using electric power supplied through the power supply path 82 that is connected to a second conduction path 22. Accordingly, the type and number of the load 98 is not limited.

The power supply device 1 is configured as a switching power supply device that is capable of performing a step-up operation and a step-down operation.

The power supply device 1 includes a first conduction path 21, the second conduction path 22, the control device 10, a voltage conversion unit 12, a detection unit 30, an auxiliary circuit unit 42, a diode 32, terminals P1 and P2, an external terminal P3, a first current sensor and a second current sensor (not illustrated), and a first voltage sensor and a second voltage sensor (not illustrated), for example.

The first conduction path 21 is a conduction path to which the generator 92 that outputs a direct current voltage of the predetermined value V1 is electrically connected, and is configured as a high-voltage power supply line to which a voltage that is higher than that applied to the second conduction path 22 is applied while the vehicle is in operation. The first conduction path 21 is connected to the power supply path 81 and is electrically connected to the generator 92 and the power storage unit 94A via the power supply path 81. A voltage corresponding to output of the generator 92 or the power storage unit 94A is applied to the first conduction path 21. In the example of FIG. 1, the terminal P1 is disposed at an end of the first conduction path 21, and the external power supply path 81 is connected to this terminal P1.

The second conduction path 22 is configured as a low-voltage power supply line to which a voltage that is lower than that applied to the first conduction path 21 is applied while the vehicle is in operation. While the voltage conversion unit 12 is performing the step-down operation in a step-down mode, an output voltage (for example, an output voltage of about 12 V) of the voltage conversion unit 12 is applied to the second conduction path 22. In the example of FIG. 1, the terminal P2 is disposed at an end of the second conduction path 22, and the external power supply path 82 is connected to this terminal P2.

The control device 10 includes a part that functions as a control unit 10A for controlling the voltage conversion unit 12 and a part that functions as a switching unit 10B for switching the auxiliary circuit unit 42. Specifically, the control device 10 includes a control circuit that has a calculation function and a drive circuit that outputs a PWM signal corresponding to a signal from the control circuit. The control circuit is configured as a microcomputer, for example, and includes a calculation device such as a CPU, a memory such as a ROM or a RAM, and an A/D converter, for example. The drive circuit outputs a PWM signal that has a duty cycle determined by the control circuit, and functions to cause the voltage conversion unit 12 to perform the step-up operation or the step-down operation. The control circuit and the drive circuit function as the control unit 10A. The control circuit also functions as the switching unit 10B and is configured to be capable of controlling on and off states of a semiconductor switch 44. Further, the control device 10 is configured to be capable of receiving a detection signal or a non-detection signal from the detection unit 30, which will be described later. Note that the control device 10 may be configured to be informed of an output voltage (a charging voltage) of the power storage unit 94A by a non-illustrated voltage detection circuit or to receive a signal based on which it is possible to identify whether the relay 94B is in the on state or in the off state. Although an example has been described in which the control circuit functions as the control unit 10A and the switching unit 10B, the control unit 10A and the switching unit 10B may be configured as different circuits that are each capable of acquiring a signal from the detection unit 30.

The power supply device 1 is provided with the non-illustrated first current sensor and second current sensor, and is capable of detecting respective current values of the first conduction path 21 and the second conduction path 22. The first current sensor is constituted by a known current detection circuit, detects a current value of a current flowing through the first conduction path 21, and inputs an analog voltage signal indicating the current value to the control device 10. Similarly, the second current sensor is constituted by a known current detection circuit, detects a current value of a current flowing through the second conduction path 22, and inputs an analog voltage signal indicating the current value to the control device 10. The control unit 10A of the control device 10 is capable of acquiring these analog voltage signals.

The power supply device 1 is provided with the non-illustrated first voltage sensor and second voltage sensor, and is capable of detecting respective voltage values of the first conduction path 21 and the second conduction path 22. The first voltage sensor is constituted by a known voltage detection circuit, detects a voltage value of the first conduction path 21, and inputs an analog voltage signal indicating the voltage value to the control device 10. Similarly, the second voltage sensor is constituted by a known voltage detection circuit, detects a voltage value of the second conduction path 22, and inputs an analog voltage signal indicating the voltage value to the control device 10. The control unit 10A of the control device 10 is capable of acquiring these analog voltage signals.

The voltage conversion unit 12 is disposed between the first conduction path 21, which is electrically connected to the power storage unit 94A, and the second conduction path 22, and is connected to these conduction paths. The voltage conversion unit 12 corresponds to an example of a step-up/down circuit unit and is configured as a circuit that selectively performs the step-down operation of stepping down a voltage applied to the first conduction path 21 and applying the stepped-down voltage to the second conduction path 22 or the step-up operation of stepping up a voltage applied to the second conduction path 22 and applying the stepped-up voltage to the first conduction path 21. The voltage conversion unit 12 is configured as, for example, a known bi-directional step-up/down DC-DC converter that includes a semiconductor switching element, an inductor, and the like. Specifically, the voltage conversion unit 12 is configured as, for example, a synchronous rectifying non-isolated DC-DC converter, and performs the step-down operation by stepping down an input voltage applied to the first conduction path 21 by a synchronous rectifying method and outputting the stepped-down voltage to the second conduction path 22, and performs the step-up operation by stepping up an input voltage applied to the second conduction path 22 by the synchronous rectifying method and outputting the stepped-up voltage to the first conduction path 21.

The part of the control device 10 functioning as the control unit 10A is capable of performing control in a step-down mode for causing the voltage conversion unit 12 to perform the step-down operation and control in a step-up mode for causing the voltage conversion unit 12 to perform the step-up operation.

When the control unit 10A performs the control in the step-down mode, the control unit 10A sends a control signal (PWM signal) for the step-down operation to the voltage conversion unit 12 to cause the voltage conversion unit 12 to perform the step-down operation so that a voltage applied to the first conduction path 21 is stepped down and is applied to the second conduction path 22. In the step-down mode, feedback control of the control signal (PWM signal) is performed such that the output voltage output from the voltage conversion unit 12 to the second conduction path 22 becomes a predetermined target voltage Va (for example, 12 V), and a duty ratio of the control signal (PWM signal) is adjusted through feedback calculation.

When the control unit 10A performs the control in the step-up mode, the control unit 10A sends a control signal (PWM signal) for the step-up operation to the voltage conversion unit 12 to cause the voltage conversion unit 12 to perform the step-up operation so that a voltage applied to the second conduction path 22 is stepped up and is applied to the first conduction path 21. In the step-up mode, feedback control of the control signal (PWM signal) is performed such that the output voltage output from the voltage conversion unit 12 to the first conduction path 21 becomes a predetermined target voltage Vb (a value slightly lower than the output voltage V1 of the generator 92), and a duty ratio of the control signal (PWM signal) is adjusted through feedback calculation.

Figure 2:
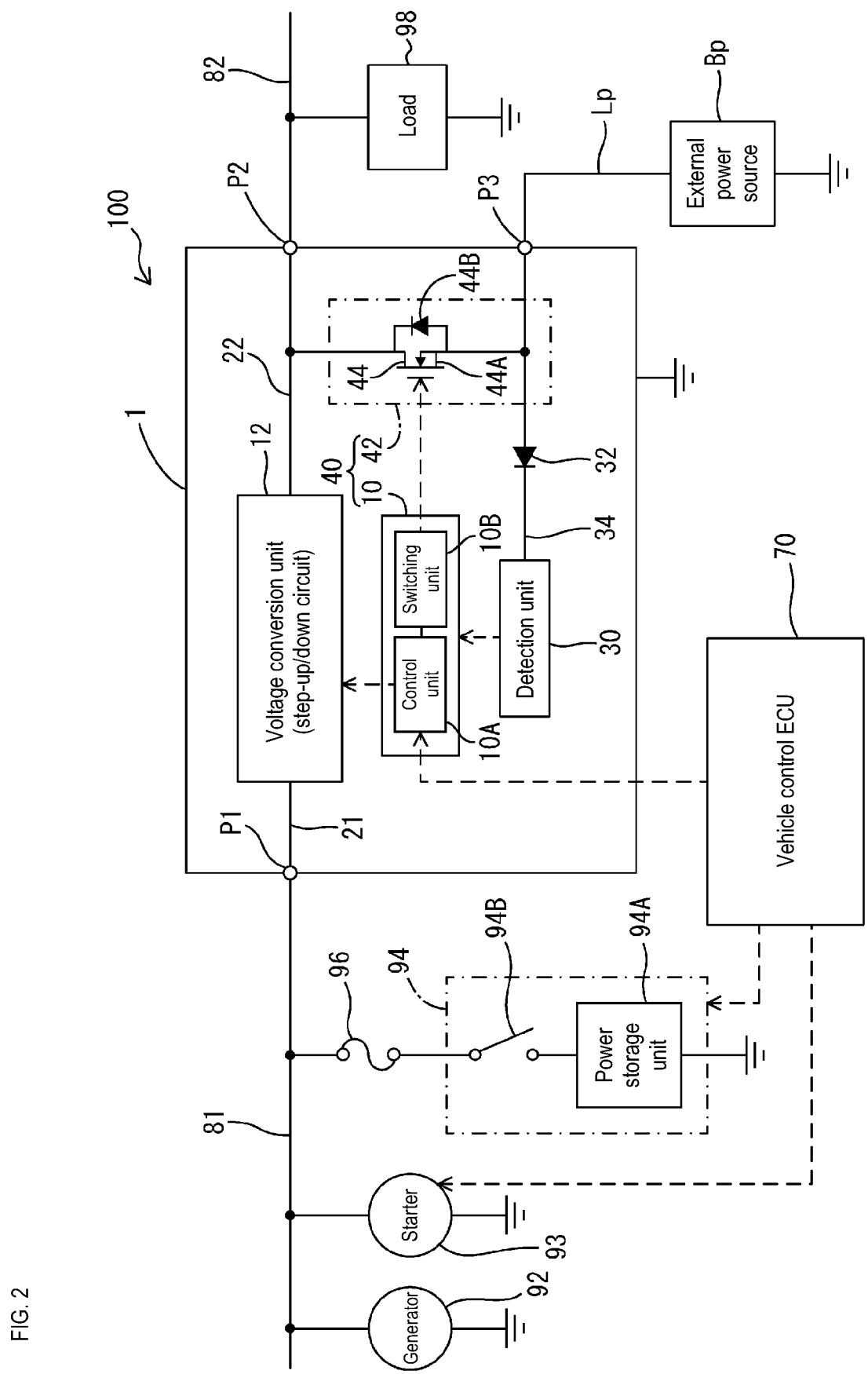
FIG. 2 is an illustrative diagram illustrating a state where a power supply path from an external power source is connected to an external terminal in the vehicle-mounted power supply system of FIG. 1.

The external terminal P3 is a terminal to which a power supply path Lp from an external power source Bp is connectable. The external power source Bp is only required to be a power source that is capable of supplying electric power through the power supply path Lp, and may be a known storage battery such as a lead battery having an output voltage of about 12 V, for example. The power supply path Lp is only required to be a conduction path that is capable of electrically connecting a positive output terminal of the external power source Bp and the external terminal P3 to each other, and may be, for example, a known booster cable or any other wiring unit. When a positive electrode unit of the external power source Bp is electrically connected to the external terminal P3 by the power supply path Lp as illustrated in FIG. 2, an output voltage of the external power source Bp is applied to the external terminal P3.

A power supply circuit unit 40 is constituted by the auxiliary circuit unit 42 and the above-described control device 10 (specifically, the switching unit 10B of the control device 10). The auxiliary circuit unit 42 is constituted by the semiconductor switch 44 and conduction paths that electrically connect the semiconductor switch 44 to respective units (the second conduction path 22, the external terminal P3, and the control device 10). The semiconductor switch 44 is configured as an N-channel MOSFET, for example, and has a drain electrically connected to the second conduction path 22, a source electrically connected to the external terminal P3 and an anode of the diode 32, and a gate connected to a signal line from the control device 10.

The semiconductor switch 44 includes a diode portion 44B that is a body diode having an anode electrically connected to the external terminal P3 and a cathode electrically connected to the second conduction path 22, and a switch portion 44A (the part other than the body diode) that is switched between an electrically connected state and an electrically disconnected state between the second conduction path 22 and the external terminal P3. The part of the control device 10 functioning as the switching unit 10B selectively outputs an ON signal or an OFF signal to the gate of the semiconductor switch 44. When the gate of the semiconductor switch 44 receives the ON signal from the switching unit 10B, the semiconductor switch 44 is switched on, and when the gate of the semiconductor switch 44 receives the OFF signal, the semiconductor switch 44 is switched off. Specifically, the switching unit 10B is configured to be capable of detecting a signal from the detection unit 30, and switches the switch portion 44A to the electrically disconnected state if connection between the external terminal P3 and the power supply path Lp is not detected by the detection unit 30, and switches the switch portion 44A to the electrically connected state if connection between the external terminal P3 and the power supply path Lp is detected by the detection unit 30. Note that, although the semiconductor switch 44 is illustrated in FIG. 1, the semiconductor switch 44 or the switch portion 44A may be replaced with another switch such as a mechanical relay.

The power supply circuit unit 40 configured as described above allows for flow of a current from the external terminal P3 side toward the second conduction path 22 side at least when the power supply path Lp is connected to the external terminal P3. Specifically, the power supply circuit unit 40 is configured to cut off flow of a current from the second conduction path 22 toward the external terminal P3 side when the second conduction path 22 is in a predetermined normal output state (when a voltage of at least a predetermined threshold is applied to the second conduction path 22 and the power supply path Lp is not connected to the external terminal P3), and to allow for flow of a current from the external terminal P3 side toward the second conduction path 22 side when the power supply path Lp is connected to the external terminal P3.

The diode 32 is an element that allows for flow of a current from the external terminal P3 side toward the detection unit 30 side and restricts flow of a current in the opposite direction. In the configuration of FIG. 1, when the output voltage of the external power source Bp is applied to the external terminal P3 as a result of the power supply path Lp being connected to the external terminal P3, a voltage corresponding to the output voltage of the external power source Bp (that is, a voltage obtained by subtracting a voltage drop at the diode 32) is applied to a conduction path 34. A threshold voltage Vth2, which will be described later, is set to be lower than an envisaged output voltage (for example, 12 V) of the external power source Bp, and when the envisaged output voltage (for example, 12 V) of the external power source Bp is applied to the external terminal P3, the voltage of the conduction path 34 becomes sufficiently higher than the threshold voltage Vth2. In contrast, the voltage of the conduction path 34 is sufficiently lower than the threshold voltage Vth2 described later in an open state where the power supply path Lp is not connected to the external terminal P3.

The detection unit 30 is a circuit that detects that the power supply path Lp is connected to the external terminal P3. The detection unit 30 is configured as, for example, a determination circuit that detects whether a voltage applied to the conduction path 34 is at least the threshold voltage Vth2, and if the voltage applied to the conduction path 34 is at least the threshold voltage Vth2, outputs a predetermined detection signal to the control device 10. If the voltage applied to the conduction path 34 is lower than the threshold voltage Vth2, the detection unit 30 outputs a predetermined non-detection signal to the control device 10. The control unit 10A and the switching unit 10B of the control device 10 are capable of recognizing which of the detection signal and the non-detection signal is output from the detection unit 30.

The following describes specific operations performed by the power supply system 100 in detail.

The power supply system 100 of FIG. 1 is, for example, a system in which no battery is connected to the power supply path 82 of the low-voltage system and that steps down output of the power storage unit 94A connected to the power supply path 81 of the high-voltage system and supplies the stepped-down output to the power supply path 82 of the low-voltage system. Further, the generator 92 and the starter 93 are provided on the power supply path 81 of the high-voltage system. In such a configuration, if the output of the power storage unit 94A decreases or stops for some reason, there is a risk that the starter 93 cannot perform the starter operation, resulting in failure to start the engine. Therefore, the power supply device 1 performs the step-up operation using electric power from the external power source Bp in such an emergency to restore the power storage unit 94A to a proper charging voltage.

Figure 3:
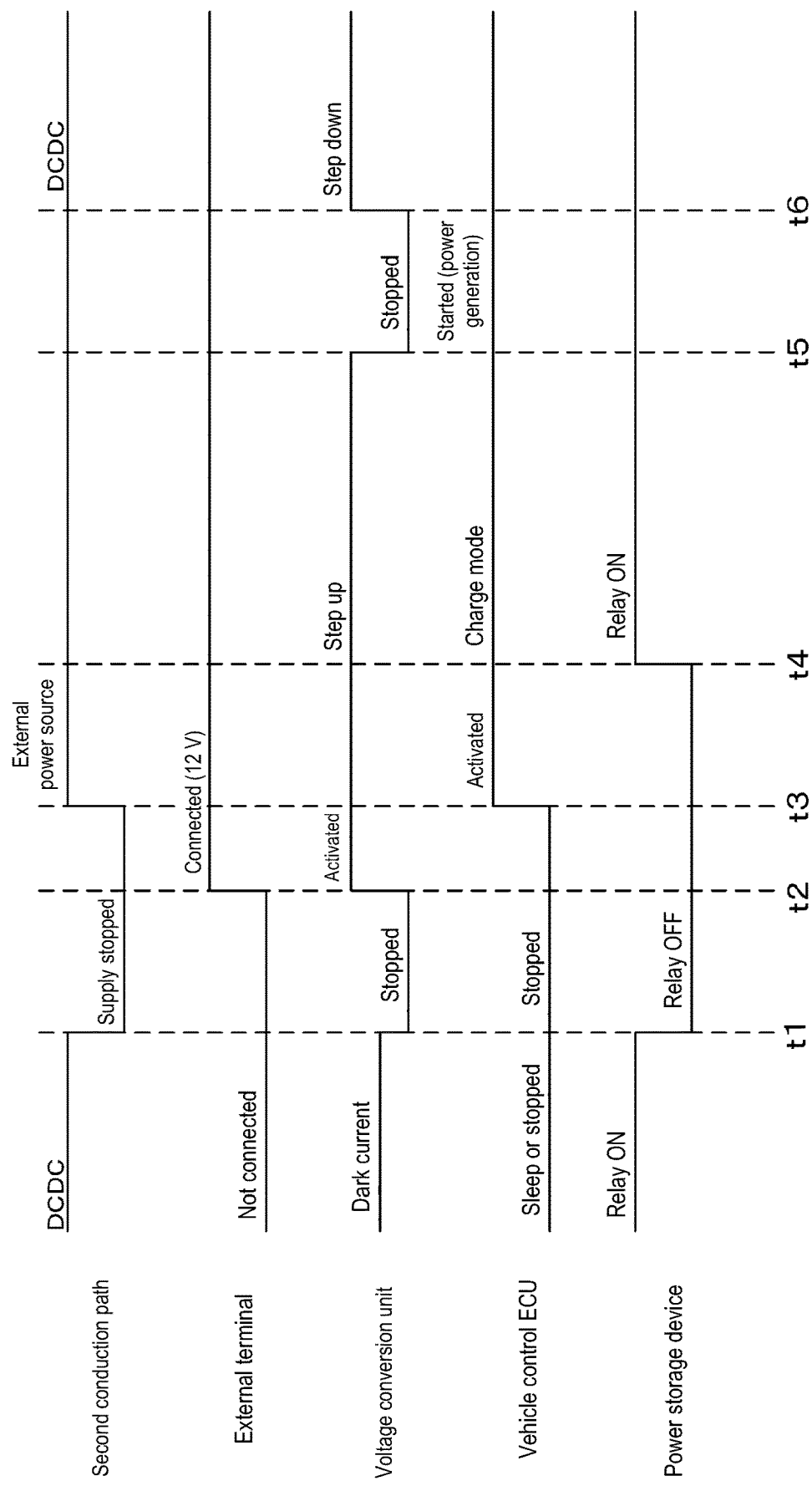
FIG. 3 is a timing chart schematically illustrating a sequence of control performed in the vehicle-mounted power supply system of FIG. 1.

FIG. 3 is a timing chart illustrating a sequence of control performed in the power supply system 100 of FIG. 1. In FIG. 3, the first line shows temporal change of the state of the second conduction path 22, the second line shows temporal change of the state of the external terminal, the third line shows temporal change of the state of the voltage conversion unit 12, the fourth line shows temporal change of the state of the vehicle control ECU 70, and the fifth line shows temporal change of the state of the power storage device 94.

In the example of FIG. 3, an ignition switch is turned off and the engine and the generator 92 are stopped during the period before time t1. During the period before time t1, the output voltage of the power storage unit 94A is at least the threshold voltage Vth1 (overdischarge is not occurring). Because the output voltage of the power storage unit 94A is at least the threshold voltage Vth1 during this period, the charge control device keeps the relay 94B in the on state, and a voltage corresponding to the output of the power storage unit 94A is applied to the power supply path 81. During the period before time t1, the vehicle control ECU 70 may be kept in a predetermined sleep state or a stopped state. Also, during the period before time t1, the control unit 10A of the control device 10 performs step-down control of the voltage conversion unit 12 in a dark current mode, and operating power is supplied to a minimum number of apparatuses such as the vehicle control ECU 70 via the second conduction path 22. The state of the period before time t1 is a normal stopped state (a state where the power storage unit 94A applies at least the threshold voltage Vth1 to the power supply path 81 and the voltage conversion unit 12 supplies electric power) where electric power to be used for the starter operation by the starter 93 is secured, and accordingly the external power source Bp need not be connected to the external terminal P3.

In the example of FIG. 3, the output voltage of the power storage unit 94A becomes less than the threshold voltage Vth1 at time t1, and the charge control device switches off the relay 94B from time t1. That is, the output from the power storage unit 94A stops from time t1, and electric power is no longer supplied to the power supply path 81 and the first conduction path 21. In such a state where the voltage conversion unit 12 does not receive proper input, the voltage conversion unit 12 cannot output a proper output voltage (for example, 12 V) to the second conduction path 22, and enters a stopped state. The output from the power storage unit 94A stays stopped and the output stopped state of the voltage conversion unit 12 continues from time t1, and accordingly electric power is not supplied to the vehicle control ECU 70 and the vehicle control ECU 70 also stops operation.

As described above, electric power is not supplied to both the first conduction path 21 and the second conduction path 22 after time t1 until time t3, which will be described later, and a proper voltage is not applied to both the first conduction path 21 and the second conduction path 22. In this state, operating power for the starter 93 cannot be secured, and the engine cannot be started. This means that the power storage unit 94A cannot be charged by operating the generator 92, and the power storage device 94 cannot be restored.

When the power supply path Lp connected to the external power source Bp is connected to the external terminal P3 as illustrated in FIG. 2 to resolve this state, electric power is supplied from the external power source Bp via the external terminal P3. When the external power source Bp capable of outputting a predetermined voltage (for example, 12 V) is electrically connected to the external terminal P3, the voltage of the conduction path 34 becomes at least the above-described threshold voltage Vth2, and accordingly the detection unit 30 detects this state (the state where the external power source Bp is electrically connected to the external terminal P3 and the voltage of the conduction path 34 is at least the threshold voltage Vth2) and outputs the above-described detection signal to the control device 10.

On the other hand, the control device 10 is configured to be capable of taking electric power from the external power source Bp via a non-illustrated path that is connected to the external terminal P3 or the conduction path 34 when the power supply path Lp is connected to the external terminal P3 to electrically connect the external power source Bp to the external terminal P3. That is, when the external power source Bp is electrically connected to the external terminal P3, the control device 10 enters an operable state ("activated" state in FIG. 3) where it is operable using electric power supplied from the external power source Bp. When the control device 10 receives the detection signal from the detection unit 30 after entering the operable state as described above, the control device 10 operates, upon receiving the detection signal, to output a predetermined notification signal from the control unit 10A to the vehicle control ECU 70 and output an ON signal from the switching unit 10B to the semiconductor switch 44. Note that the output of the predetermined notification signal continues at least until the vehicle control ECU 70 is activated and receives this signal, and the output of the ON signal to the semiconductor switch 44 continues at least until a step-down operation described later is executed.

When the switching unit 10B outputs the ON signal to the semiconductor switch 44, the semiconductor switch 44 is switched on at time t3 when the output of the ON signal starts, and electric power is supplied from the external power source Bp to the second conduction path 22 via the semiconductor switch 44. Once the semiconductor switch 44 is switched on, a voltage that is approximately an output voltage (for example, 12 V) of the external power source Bp is applied to the second conduction path 22. Note that, although electric power is also supplied via the diode portion 44B (body diode) during the period from time t2 to time t3, a larger current can flow after time t3 with a loss being suppressed.

On the other hand, the vehicle control ECU 70 enters an operable state ("activated" state in FIG. 3) at least at time t3 as a result of an operating voltage being supplied via the second conduction path 22. When the vehicle control ECU 70 receives the above-described predetermined notification signal from the control unit 10A after entering the operable state as described above, the vehicle control ECU 70 determines, in response to this notification signal, whether the power storage unit 94A should be charged. If a predetermined charge starting condition is satisfied (for example, when it is determined that the output voltage (charging voltage) of the power storage unit 94A is a predetermined charge determination threshold or less), the vehicle control ECU 70 outputs a charge instruction signal for instructing charging to the control unit 10A and outputs an on-operation instruction signal for instructing an on operation of the relay 94B to the above-described charge control device (not illustrated). In the example of FIG. 3, the vehicle control ECU 70 outputs the charge instruction signal and the on-operation instruction signal at time t4. The on operation of the relay 94B and a charging operation (a step-up operation) by the control unit 10A are started under the control described above. Note that the vehicle control ECU 70 may immediately output the charge instruction signal to the control unit 10A and the on-operation instruction signal to the charge control device upon receiving the above-described predetermined notification signal after being activated.

At time t4 when the charge instruction signal and the on-operation instruction signal are output by the vehicle control ECU 70, the relay 94B is switched on and the control unit 10A performs control for causing the voltage conversion unit 12 to perform the step-up operation. Specifically, the voltage conversion unit 12 is caused to perform the step-up operation so that an input voltage (a voltage that is based on electric power supplied from the external power source Bp) applied to the second conduction path 22 is stepped up and is output as a voltage of a desired target value (the voltage Vb lower than the output voltage V1 of the generator 92) to the first conduction path 21.

As described above, according to this configuration, when the detection unit 30 detects connection between the external terminal P3 and the power supply path Lp right after time t2, in response to this detection by the detection unit 30, the control unit 10A causes the voltage conversion unit 12 to perform the step-up operation to output the voltage Vb lower than the output voltage V1 of the generator 92 to the first conduction path 21.

When a predetermined ending condition is satisfied (for example, when the output voltage of the power storage unit 94A reaches a predetermined charge stop threshold (operable threshold) that enables the starter 93 to perform the starter operation) after the step-up operation of the voltage conversion unit 12 is started at time t4, the control unit 10A causes the voltage conversion unit 12 to stop the step-up operation. In the example of FIG. 3, the voltage conversion unit 12 stops the step-up operation and stops charging the power storage unit 94A at time t5.

When a predetermined start condition is satisfied (for example, when the output voltage (charging voltage) of the power storage unit 94A reaches the predetermined charge stop threshold (operable threshold) that enables the starter 93 to perform the starter operation, or when the step-up operation of the voltage conversion unit 12 that has been performed from time t4 is stopped), the vehicle control ECU 70 instructs the starter 93 to start and perform the starter operation to start the engine. Note that the vehicle control ECU 70 may cause the starter 93 to automatically perform the starter operation to start the engine when the predetermined start condition is satisfied, or may cause the starter 93 to perform the starter operation to start the engine when a predetermined operation switch (an operation switch that switches on and off states of the ignition switch) is turned on after the predetermined start condition is satisfied.

When the engine is started by the starter operation performed by the starter 93, the generator 92 performs a power generating operation. After the power generating operation of the generator 92 is started as described above, the control unit 10A causes the voltage conversion unit 12 to perform a step-down operation. In the example of FIG. 3, the control unit 10A causes the voltage conversion unit 12 to perform the step-down operation (step-down operation of outputting a predetermined target voltage (for example, 12 V) to the second conduction path 22) from time t6. After the step-down operation is started by the voltage conversion unit 12 as described above, the switching unit 10B switches off the semiconductor switch 44. Once the semiconductor switch 44 is switched off by the switching unit 10B, no problems arise even if the power supply path Lp is removed from the external terminal P3.

In the example of FIG. 3, a voltage that is based on electric power from the external power source Bp is applied to the second conduction path 22 during a period from time t3 when the semiconductor switch 44 is switched on until t6 when the step-down operation is started, and after the start of the step-down operation at time t6, a voltage that is based on output of the voltage conversion unit 12 can be applied to the second conduction path 22. Such a state where the voltage conversion unit 12 performs the step-down operation of applying a predetermined output voltage (for example, 12 V) to the second conduction path 22 with the semiconductor switch 44 being switched off is a normal output state (regular state) of the voltage conversion unit 12, and the normal output state (regular state) continues while the vehicle is in operation until the ignition switch is switched off.

In the example of FIG. 3, the voltage conversion unit 12 stops the step-up operation at time t5 before the generator 92 starts and performs the power generating operation, but the voltage conversion unit 12 may stop the step-up operation after the generator 92 starts and performs the power generating operation after the step-up operation is started by the voltage conversion unit 12 at time t4. For example, when the output voltage of the power storage unit 94A reaches a predetermined threshold (operable threshold) that enables the starter 93 to perform the starter operation after time t4, the starter 93 may perform the starter operation to start the engine while the step-up operation of the voltage conversion unit 12 is continuing, and the step-up operation of the voltage conversion unit 12 may be stopped after the generator 92 starts power generation in response to the start of the engine.

The following describes examples of effects of the present configuration.

In the above-described vehicle-mounted power supply device 1, the detection unit 30 detects that the power supply path Lp is connected to the external terminal P3, and the power supply circuit unit 40 allows for flow of a current from the external terminal P3 side toward the second conduction path 22 side at least when the external power supply path Lp is connected to the external terminal P3. Further, the control unit 10A causes the voltage conversion unit 12 (step-up/down circuit unit) to perform the step-up operation in such a state where electric power is supplied from the outside to the second conduction path 22 side via the external terminal P3, and therefore it is possible to apply a relatively high voltage to the first conduction path 21 that is electrically connected to the power storage unit 94A and favorably charge the power storage unit 94A. Particularly, when the charging voltage of the power storage unit 94A decreases and there are problems in operating vehicle-mounted apparatuses, it is possible to definitely detect connection with the external power source Bp and charge the power storage unit 94A by stepping up a supply voltage based on the external power source Bp, and therefore restoration from such a situation can be properly carried out.

The power supply circuit unit 40 is configured to cut off flow of a current from the second conduction path 22 toward the external terminal P3 side at least when the second conduction path 22 is in the predetermined normal output state, and allow for flow of a current from the external terminal P3 side toward the second conduction path 22 side when the power supply path Lp is connected to the external terminal P3.

The vehicle-mounted power supply device 1 of this configuration prevents flow of a current from the second conduction path 22 toward the external terminal P3 side when the second conduction path 22 is in the normal output state, and therefore it is possible to keep the external terminal P3 in a state where it is hardly affected by the second conduction path 22. On the other hand, when the power supply path Lp is connected to the external terminal P3 (that is, when electric power can be supplied from the external power source Bp via the external terminal P3), a current can flow from the external terminal P3 side toward the second conduction path 22 side, and accordingly it is possible to perform the step-up operation of stepping up an input voltage based on the external power source Bp and applying the stepped-up voltage to the first conduction path 21.

The power supply circuit 40 includes: the semiconductor switch 44 that includes the diode portion 44B having the anode electrically connected to the external terminal P3 and the cathode electrically connected to the second conduction path 22, and the switch portion 44A that is switched between the electrically connected state and the electrically disconnected state between the second conduction path 22 and the external terminal P3; and the switching unit 10B that switches the switch portion 44A to the electrically disconnected state if connection between the external terminal P3 and the power supply path Lp is not detected by the detection unit 30, and switches the switch portion 44A to the electrically connected state if connection between the external terminal P3 and the power supply path Lp is detected by the detection unit 30.

The vehicle-mounted power supply device 1 of this configuration can prevent flow of a current from the second conduction path 22 toward the external terminal P3 side when connection between the external terminal P3 and the power supply path Lp (that is, a state where electric power is supplied from the external power source Bp via the external terminal P3) is not detected by the detection unit 30, and switch the switch portion 44A to the electrically connected state when connection between the external terminal P3 and the power supply path Lp is detected by the detection unit 30, and thus the vehicle-mounted power supply device 1 can allow for flow of a current from the external terminal P3 side toward the second conduction path 22 side while suppressing a conduction loss.

The first conduction path 21 is a conduction path to which the generator 92 that outputs the predetermined voltage V1 is electrically connected, and when connection between the external terminal P3 and the power supply path Lp is detected by the detection unit 30, the control unit 10A causes the voltage conversion unit 12 (step-up/down circuit unit) to perform the step-up operation so that the voltage Vb lower than the output voltage V1 of the generator 92 is output to the first conduction path 21.

The vehicle-mounted power supply device 1 of this configuration can charge the power storage unit 94A by preferentially using electric power from the generator 92 for example when the power generating operation of the generator 92 and the step-up operation of the voltage conversion unit 12 are performed during the same period (for example when a method is employed in which the step-up operation of the voltage conversion unit 12 is stopped after the power generating operation of the generator 92), and therefore consumption of the electric power from the external power source Bp tends to be suppressed.

The voltage conversion unit 12 is configured as a step-up/down circuit unit that selectively performs the step-down operation or the step-up operation.

This vehicle-mounted power supply device 1 can perform, with a simpler configuration, the step-down operation of stepping down a voltage applied to the first conduction path 21 and applying the stepped-down voltage to the second conduction path 22 at a normal time during which the step-down operation should be performed, and perform the step-up operation under a condition that the power supply path Lp is connected to the external terminal P3 when charging should be performed by connecting the external power source Bp to the external terminal P3.

Second Embodiment

Next, a second embodiment will be described.

Figure 4:
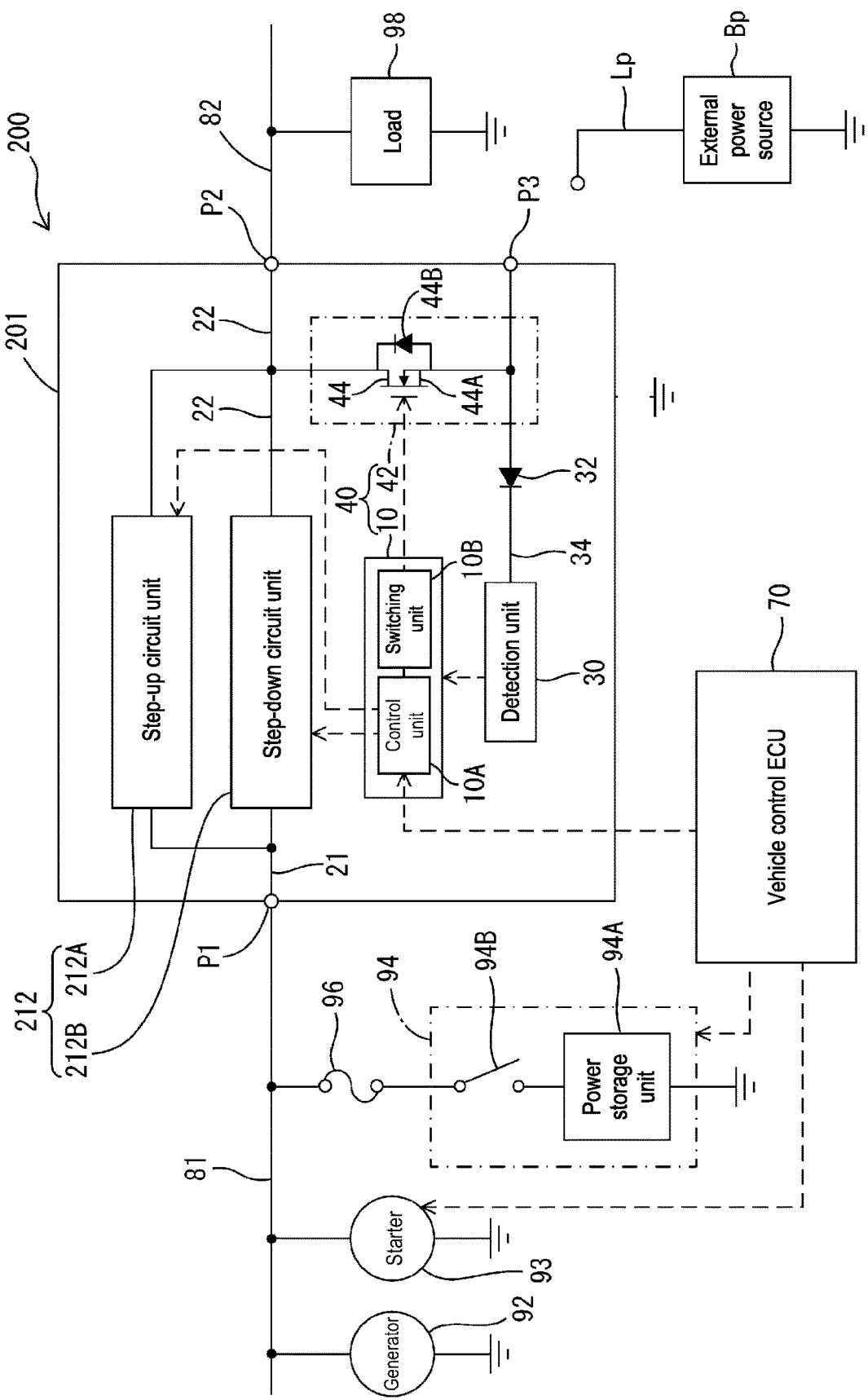
FIG. 4 is a circuit diagram schematically illustrating a vehicle-mounted power supply system that includes a vehicle-mounted power supply device of a second embodiment.

FIG. 4 schematically illustrates a vehicle-mounted power supply system 200 that includes a vehicle-mounted power supply device 201 (hereinafter also referred to as a power supply device 201) of the second embodiment. The vehicle-mounted power supply system 200 is the same as the vehicle-mounted power supply system 100 of the first embodiment in all aspects other than that a power supply device 201 is used instead of the power supply device 1. That is, in the example of FIG. 4, units other than the power supply device 201 have configurations and functions similar to those of corresponding units in the first embodiment. The power supply device 201 of the second embodiment is the same as the power supply device 1 of the first embodiment in all aspects other than that the power supply device 201 includes a voltage conversion unit 212 instead of the voltage conversion unit 12 and the control unit 10A controls a step-up operation of a step-up circuit unit 212A and a step-down operation of a step-down circuit unit 212B independently from each other.

The voltage conversion unit 212 of the power supply device 201 is disposed between the first conduction path 21, which is electrically connected to the power storage unit 94A, and the second conduction path 22, and is connected to these conduction paths. Provided are the step-down circuit unit 212B that performs the step-down operation of stepping down a voltage applied to the first conduction path 21 and applying the stepped-down voltage to the second conduction path 22, and the step-up circuit unit 212A that is configured as a path different from the step-down circuit unit 212B, steps up a voltage applied to the second conduction path 22, and applies the stepped-up voltage to the first conduction path 21. The step-down circuit unit 212B and the step-up circuit unit 212A are disposed in parallel to each other between the first conduction path 21 and the second conduction path 22.

The step-up circuit unit 212A is configured as, for example, a known step-up DC-DC converter that includes a semiconductor switching element, an inductor, and the like. Specifically, the step-up circuit unit 212A is configured as, for example, a synchronous rectifying non-isolated DC-DC converter, and performs the step-up operation by stepping up an input voltage applied to the second conduction path 22 by the synchronous rectifying method and outputting the stepped-up voltage to the first conduction path 21.

The step-down circuit unit 212B is configured as, for example, a known step-down DC-DC converter that includes a semiconductor switching element, an inductor, and the like. Specifically, the step-down circuit unit 212B is configured as, for example, a synchronous rectifying non-isolated DC-DC converter, and performs the step-down operation by stepping down an input voltage applied to the first conduction path 21 by the synchronous rectifying method and outputting the stepped-down voltage to the second conduction path 22.

Control performed by the control unit 10A in the step-up mode and the step-down mode is slightly different from that in the first embodiment, and control other than control for causing the step-up operation and the step-down operation is the same as that in the first embodiment. When the control unit 10A performs control in the step-down mode, the control unit 10A performs control so that a voltage applied to the first conduction path 21 is stepped down and is applied as an output voltage to the second conduction path 22, and performs feedback control on the step-down circuit unit 212B using a PWM signal as a control signal such that the output voltage becomes the above-described target voltage value Va (for example, 12 V). When the control unit 10A performs control in the step-up mode, the control unit 10A performs control so that a voltage applied to the second conduction path 22 is stepped up and is applied as an output voltage to the first conduction path 21, and performs feedback control on the step-up circuit unit 212A using a PWM signal as a control signal such that the output voltage becomes the above-described target voltage value Vb (for example, a value slightly lower than the output voltage of the generator 92).

In the present configuration, control can also be performed in a sequence similar to that in the first embodiment (the sequence illustrated in FIG. 3). The only difference from the first embodiment is that the step-up circuit unit 212A is operated when the step-up operation is performed from time t4, and the step-down circuit unit 212B is operated before time t1 or from time t6.

In the normal state where the power storage unit 94A outputs at least the threshold voltage Vth1, the vehicle-mounted power supply device 201 of this configuration can perform the step-down operation through the step-down circuit unit 212B so that the voltage applied to the first conduction path 21 is stepped down and is applied to the second conduction path 22, and thus the vehicle-mounted power supply device 201 can supply proper electric power to the load 98 and the like through the second conduction path 22 in the normal state. On the other hand, when the power supply path Lp is connected to the external terminal P3 by a worker (that is, when electric power is supplied from the external power source Bp via the external terminal P3) in a situation in which output of the power storage unit 94A is stopped, for example, the step-up circuit unit 212A can perform the step-up operation so that the voltage applied to the second conduction path 22 is stepped up and is applied to the first conduction path 21. Furthermore, the step-down operation and the step-up operation can be performed independently by the different circuit units, and accordingly operation of one circuit unit is unlikely to be restricted by operation of the other circuit unit.

Although FIG. 3 illustrates an example in which the step-up operation and the step-down operation are performed during different periods, this example should not be taken as a limitation. For example, when connection between the external terminal P3 and the power supply path Lp is detected by the detection unit 30, the control unit 10A may perform control to cause the step-down circuit unit 212B to perform the step-down operation while causing the step-up circuit unit 212A to perform the step-up operation. When control is performed as described above, the step-down operation can be performed simultaneously with the step-up operation during which the power storage unit 94A can be charged, and therefore proper electric power can be supplied to an apparatus connected to the second conduction path 22 even during the charging.

In an example where the step-up operation and the step-down operation are simultaneously performed, control from time t4 is slightly changed in the sequence illustrated in FIG. 3. For example, in a case where the control unit 10A controls the step-up circuit unit 212A to perform the step-up operation from time t4 in FIG. 3, the control unit 10A may perform control to cause the step-down circuit unit 212B to perform the step-down operation while causing the step-up circuit unit 212A to perform the step-up operation, after a predetermined step-down operation start time (for example, when the relay 94B of the power storage device 94 is switched on or when the output voltage (charging voltage) of the power storage unit 94A exceeds a value (a predetermined value that is lower than the above-described charge stop threshold)). In this case, the step-down operation can be started at the above-described step-down operation start time, which is earlier than time t6 in FIG. 3. Note that, in this case, the step-up operation may be ended at time t5 in FIG. 3 (before the generator 92 starts operation) as in the first embodiment, or after the generator 92 starts operation.

Other Embodiments

The present disclosure is not limited to the embodiments described above with reference to the drawings, and the following embodiments are also included in the technical field of the present disclosure, for example. Also, the above-described embodiments and the following embodiments can be combined so long as no contradiction is incurred.

Figure 5:
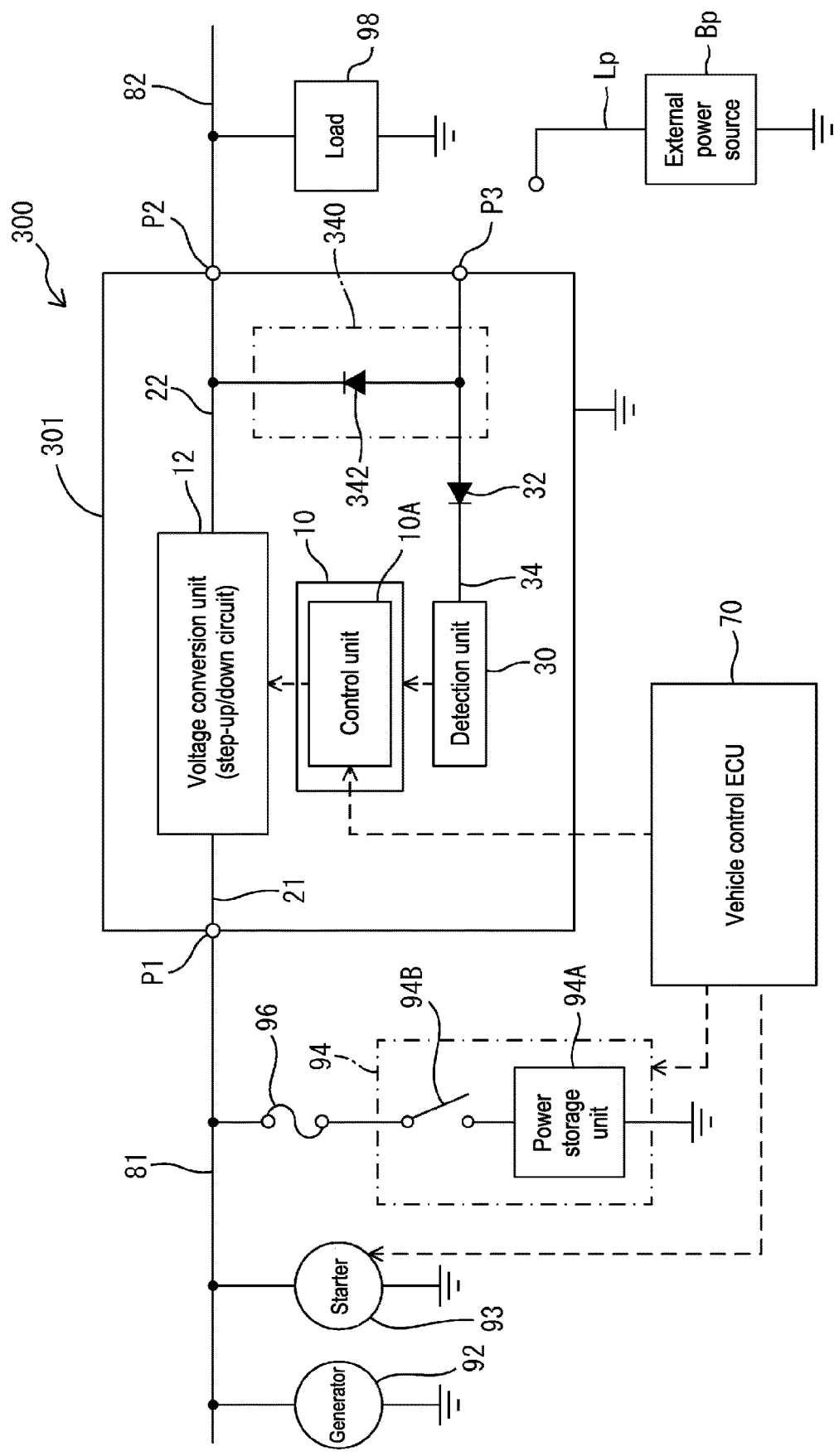
FIG. 5 is a circuit diagram schematically illustrating a vehicle-mounted power supply system that includes a vehicle-mounted power supply device of another embodiment.

Although the power supply circuit unit 40 including the semiconductor switch 44 as a main component as illustrated in FIG. 1 is described as an example in the first and second embodiments, the power supply circuit unit 40 may be replaced with a power supply circuit unit 340 as illustrated in FIG. 5 in any of the first and second embodiments and variations of these. Note that a vehicle-mounted power supply device 301 illustrated in FIG. 5 has a configuration similar to that of the vehicle-mounted power supply device 1 of the first embodiment other than that the power supply circuit unit 40 is replaced with the power supply circuit unit 340 and control of the on and off states of the semiconductor switch 44 is omitted. The power supply circuit unit 340 illustrated in FIG. 5 includes a diode 342 having an anode electrically connected to the external terminal P3 and a cathode electrically connected to the second conduction path 22, and does not include a switch portion. In the vehicle-mounted power supply device 301 of FIG. 5, it is also possible to cut off flow of a current from the second conduction path 22 toward the external terminal P3 side when the second conduction path 22 is in the predetermined normal output state (when an output voltage of a predetermined value (for example, 12 V) is applied to the second conduction path 22 by the step-down operation of the voltage conversion unit 12 and the power supply path Lp is not connected to the external terminal P3), and maintain the electric potential of the external terminal P3 at a value sufficiently lower than the electric potential of the second conduction path 22 in the predetermined normal output state. When the power supply path Lp is connected to the external terminal P3, a current can flow from the external terminal P3 side toward the second conduction path 22 side as a result of electric power being supplied from the external power source Bp. These functions can be realized with a simpler configuration in this embodiment. Note that control performed by the control device 10 in the configuration of FIG. 5 is similar to that in the first embodiment, other than that control of the on and off states of the semiconductor switch 44 is omitted, and the control unit 10A performs the control similar to that in the first embodiment.

Although the generator 92 and the starter 93 are provided as separate units that are electrically connected to the power supply path 81 in the first and second embodiments, an integrated unit that serves as both the generator and the starter may be used in any of the first and second embodiments and variations of these.

Although the detection unit 30 configured as the determination circuit is described as an example in the first and second embodiments, the detection unit is only required to be capable of detecting that the external power source Bp is electrically connected to the external terminal P3 and outputting the detection signal to the control device 10 upon detection in the first and second embodiments and variations of these.

Although the configuration described as an example in the first embodiment does not include a battery (battery different from the power storage unit 94A) that is connected to the second conduction path 22 on the output side, a power storage means may be electrically connected to the second conduction path 22 in any of the first and second embodiments and variations of these.

The invention claimed is:

1. A vehicle-mounted power supply device comprising:
a voltage conversion unit that is connected to a first conduction path electrically connected to a vehicle-mounted power storage unit and a second conduction path, and is configured to perform a step-down operation of stepping down a voltage applied to the first conduction path and applying the stepped-down voltage to the second conduction path, and a step-up operation of stepping up a voltage applied to the second conduction path and applying the stepped-up voltage to the first conduction path;
an external terminal to which a power supply path from an external power source is connectable;
a detection unit configured to detect that the power supply path is connected to the external terminal;
a power supply circuit unit configured to allow for flow of a current from the external terminal side toward the second conduction path side at least when the power supply path is connected to the external terminal; and
a control unit configured to control the step-down operation and the step-up operation of the voltage conversion unit and cause the voltage conversion unit to perform the step-up operation when connection between the external terminal and the power supply path is detected by the detection unit,
wherein when a direct current power source is connected to the external terminal, the power supply circuit unit applies a direct current voltage corresponding to an output voltage of the direct current power source to the second conduction path.

2. The vehicle-mounted power supply device according to claim 1,
wherein the power supply circuit unit cuts off flow of a current from the second conduction path toward the external terminal side at least when the second conduction path is in a predetermined normal output state, and allows for flow of a current from the external terminal side toward the second conduction path side when the power supply path is connected to the external terminal.

3. The vehicle-mounted power supply device according to claim 2,
wherein the power supply circuit unit includes:
a semiconductor switch that includes a diode portion and a switch portion, the diode portion having an anode electrically connected to the external terminal and a cathode electrically connected to the second conduction path, the switch portion being switched between an electrically connected state and an electrically disconnected state between the second conduction path and the external terminal; and
a switching unit that switches the switch portion to the electrically disconnected state if connection between the external terminal and the power supply path is not detected by the detection unit, and switches the switch portion to the electrically connected state if connection between the external terminal and the power supply path is detected by the detection unit.

4. The vehicle-mounted power supply device according to claim 2, wherein the power supply circuit unit is constituted by a diode that has an anode electrically connected to the external terminal and a cathode electrically connected to the second conduction path.

5. The vehicle-mounted power supply device according to claim 1,
wherein a generator is connected to the first conduction path, and
when connection between the external terminal and the power supply path is detected by the detection unit, the control unit causes the voltage conversion unit to perform the step-up operation to output a voltage lower than an output voltage of the generator to the first conduction path.

6. The vehicle-mounted power supply device according to claim 1, wherein the voltage conversion unit includes a step-up/down circuit unit that selectively performs the step-down operation or the step-up operation.

7. The vehicle-mounted power supply device according to claim 1, wherein the voltage conversion unit includes:
a step-down circuit unit that performs the step-down operation of stepping down a voltage applied to the first conduction path and applying the stepped-down voltage to the second conduction path; and
a step-up circuit unit that is a path different from the step-down circuit unit, steps up a voltage applied to the second conduction path, and applies the stepped-up voltage to the first conduction path.

8. The vehicle-mounted power supply device according to claim 7,
wherein when connection between the external terminal and the power supply path is detected by the detection unit, the control unit causes the step-down circuit unit to perform the step-down operation while causing the step-up circuit unit to perform the step-up operation so that there is a period during which both the step-up circuit unit and the step-down circuit unit operate.

9. The vehicle-mounted power supply device according to claim 2,
wherein a generator is connected to the first conduction path, and
when connection between the external terminal and the power supply path is detected by the detection unit, the control unit causes the voltage conversion unit to perform the step-up operation to output a voltage lower than an output voltage of the generator to the first conduction path.

10. The vehicle-mounted power supply device according to claim 3,
wherein a generator is connected to the first conduction path, and
when connection between the external terminal and the power supply path is detected by the detection unit, the control unit causes the voltage conversion unit to perform the step-up operation to output a voltage lower than an output voltage of the generator to the first conduction path.

11. The vehicle-mounted power supply device according to claim 4,
wherein a generator is connected to the first conduction path, and when connection between the external terminal and the power supply path is detected by the detection unit, the control unit causes the voltage conversion unit to perform the step-up operation to output a voltage lower than an output voltage of the generator to the first conduction path.

12. The vehicle-mounted power supply device according to claim 2, wherein the voltage conversion unit includes a step-up/down circuit unit that selectively performs the step-down operation or the step-up operation.

13. The vehicle-mounted power supply device according to claim 3, wherein the voltage conversion unit includes a step-up/down circuit unit that selectively performs the step-down operation or the step-up operation.

14. The vehicle-mounted power supply device according to claim 4, wherein the voltage conversion unit includes a step-up/down circuit unit that selectively performs the step-down operation or the step-up operation.

15. The vehicle-mounted power supply device according to claim 5, wherein the voltage conversion unit includes a step-up/down circuit unit that selectively performs the step-down operation or the step-up operation.

16. The vehicle-mounted power supply device according to claim 2,
wherein the voltage conversion unit includes:
a step-down circuit unit that performs the step-down operation of stepping down a voltage applied to the first conduction path and applying the stepped-down voltage to the second conduction path; and
a step-up circuit unit that is a path different from the step-down circuit unit, steps up a voltage applied to the second conduction path, and applies the stepped-up voltage to the first conduction path.

17. The vehicle-mounted power supply device according to claim 3,
wherein the voltage conversion unit includes:
a step-down circuit unit that performs the step-down operation of stepping down a voltage applied to the first conduction path and applying the stepped-down voltage to the second conduction path; and
a step-up circuit unit that is a path different from the step-down circuit unit, steps up a voltage applied to the second conduction path, and applies the stepped-up voltage to the first conduction path.

18. The vehicle-mounted power supply device according to claim 4,
wherein the voltage conversion unit includes:
a step-down circuit unit that performs the step-down operation of stepping down a voltage applied to the first conduction path and applying the stepped-down voltage to the second conduction path; and
a step-up circuit unit that is a path different from the step-down circuit unit, steps up a voltage applied to the second conduction path, and applies the stepped-up voltage to the first conduction path.

19. The vehicle-mounted power supply device according to claim 5,
wherein the voltage conversion unit includes:
a step-down circuit unit that performs the step-down operation of stepping down a voltage applied to the first conduction path and applying the stepped-down voltage to the second conduction path; and
a step-up circuit unit that is a path different from the step-down circuit unit, steps up a voltage applied to the second conduction path, and applies the stepped-up voltage to the first conduction path.

* * * * *